(No Model.)
J. H. CLOYES.
SIDE SPRING VEHICLE.
No. 468,422. Patented Feb. 9, 1892.
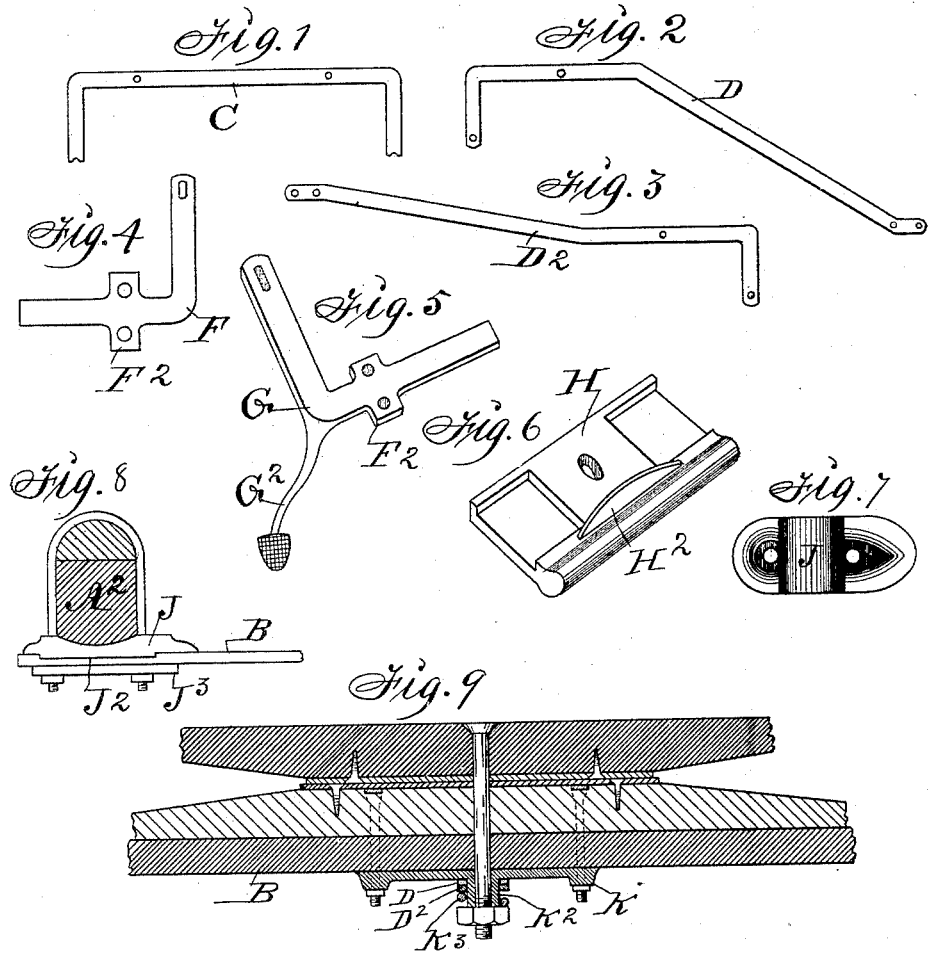

UNITED STATES PATENT OFFICE.

JAMES H. CLOYES, OF DES MOINES, IOWA.

SIDE-SPRING VEHICLE.

SPECIFICATION forming part of Letters Patent No. 468,422, dated February 9, 1892.

Application filed March 9, 1891. Serial No. 384,362. (No model.)

*To all whom it may concern:*

Be it known that I, JAMES H. CLOYES, a citizen of the United States of America, and a resident of Des Moines, in the county of Polk and State of Iowa, have invented a new and useful Improvement in Side-Spring Vehicles, of which the following is a specification.

The object of my invention is to prevent the torsional strain and damage and breaking of the connections between the springs, the reach-irons, and the axles incident to the weight on the seat being in an unbalanced position thereon; and it consists in the construction and combination of reach-irons, rub-irons, braces, steps, and reinforcing-plates with side springs and axles, as hereinafter set forth, pointed out in my claims, and illustrated in the accompanying drawings, in which—

Figure 1 is a plan view of a side-spring brace; Fig. 2, of a reach-iron adapted to be connected with the front axle, and Fig. 3 a reach-iron adapted to be connected with the rear axle of a vehicle. Fig. 4 is a plan view of a brace-iron; Fig. 5, a perspective view of a brace-iron and step combined, and Fig. 6 an enlarged perspective view of a rub-iron adapted to be combined with said brace-irons. Fig. 7 is a top view of a reinforcing-plate adapted to be combined with an axle and the end of a side spring, and Fig. 8 is a sectional view showing it applied as required to prevent the breaking of a spring at the point where it is connected with an axle. Fig. 9 is a sectional view showing the construction and combination of a reinforcing-plate and pivot with the front axle and the reach-irons. Fig. 10 is a perspective view of a section of a running-gear, showing the different novel elements combined with a side spring and axles, as required for practical use.

A is the front axle, $A^2$ the rear axle, and B one of the side springs of the running-gear of a side-spring vehicle.

C is a brace bent at right angles at each end and notched at the center of each extremity, so that when the ends of two mating braces are in contact under one of a pair of side springs a bolt can be passed through between the two ends of the braces and a coinciding perforation in the spring, or their ends may be united to produce a complete brace in one piece.

D is a reach-iron adapted to be pivoted to the reinforcing-plate, fixed to the front axle and also adapted in shape at its rear end to overlap the elbow-shaped end of one of the braces C.

$D^2$ is a reach-iron adapted to be fixed to the rear axle and to overlap the elbow-shaped end of one of the braces C.

The brace-irons C, the reach-irons D, and the reach-irons $D^2$ are formed in pairs, so that they can be interchangeably used and readily replaced when necessary in making repairs.

F is a brace-iron designed to conform in shape and size with the elbow-shaped ends of the braces C and reach-irons D and $D^2$ and to overlap them when they are joined together, as shown in Fig. 10.

$F^2$ are perforated lateral projections adapted to admit the ends of a clip that strides the spring B and the overlapping ends of the braces C and reach-irons D and $D^2$, as shown in Fig. 10.

G is a brace corresponding in shape with the brace F, and $G^2$ is a step formed integral therewith.

H is a rub-iron provided with cavities in its end portions, adapted to admit the ends of the braces F and G and to form a connection between them when it is applied, as shown in Fig. 10.

$H^2$ is a vertical flange adapted to engage the outside edges of the irons C, D, and $D^2$.

J is a perforated plate adapted to lie across the under side of the axle $A^2$ and on top of the rear end of a spring B. It has flanges $J^2$ at its sides that project downward over the edges of the spring, as shown in Fig. 8.

$J^3$ is a washer or plate that has perforations coinciding with the perforations in the plate J and adapted to be jointly fastened with the plate J to the axle and spring by means of a common clip and to reinforce the spring as required to prevent it from being damaged or broken at its juncture with the axle.

K is a reinforcing-plate and has a perforation in its center and a boss $K^2$ on its under side, adapted to admit a king-bolt to pass down through it, and perforated ears projecting laterally from its ends, adapted to admit the passage of the ends of clips that stride the axle A and clamp the plate to the axle, as shown in Figs. 9 and 10.

$K^3$ is a split-ring spring-washer on the boss $K^2$.

In combining the different parts to produce an improved running-gear I place the elbow-shaped ends of the mating braces C against the under sides of the centers of the springs B, the elbow-shaped ends of the reach-irons D and $D^2$ in overlapping position and on the under side of the mating ends of the braces C, the rub-irons H on the center and under side of the overlapping parts, and then fasten them all together by means of a bolt passed through their coinciding perforations. I next slip the ends of the braces F and G into the cavities in the ends of the rub-irons and clamp them and the corner portions of the braces C and reach-irons D and $D^2$ to the springs B by means of clips that stride the springs, as shown in Fig. 10. The braces F and G and step $G^2$ may be left off whenever desired without affecting the efficiency of the combination of the overlaying ends of the braces C and reach-irons D and $D^2$ with the spring B as a means of reinforcing and binding the springs so firmly together that they will be jointly depressed by an unbalanced load bearing thereon and torsional strain prevented by such rigid connection of the overlaying braces C and reach-irons D and $D^2$ with the two mating springs B. The ends of the springs are then combined with the rear axle and the spring-bar on the front axle and the front ends of the reach-irons D placed in overlapping position and jointly placed on the pivotal boss $K^2$ on the plate K, fixed to the front axle.

I claim as my invention—

1. In a side-spring vehicle, the combination of two interchangeable spring-braces having elbow-shaped ends, two interchangeable reach-irons having rear ends corresponding in shape and size with the ends of said brace and front ends having perforations adapting them to be jointly pivoted to the front axle by means of a bolt, and two interchangeable reach-irons having front ends corresponding in shape and size with said braces and rear ends adapted to be fixed to the rear axle with two side springs by means of clips, in the manner set forth, for the purposes stated.

2. In a running-gear, the combination of two elbow-shaped braces, one of said braces having an integral step, two reach-irons having elbows at their ends corresponding in size and shape with the braces, two braces elbow-shaped at each end and adapted to extend from one side spring to another mating spring, and two side springs, as and for the purposes stated.

3. In a running-gear for vehicles, the combination of two elbow-shaped braces, one of said braces having an integral step, a rub-iron having cavities in its ends to admit the ends of said braces, two reach-irons having elbow-shaped ends corresponding in size and shape with the ends of said braces, and a side spring, as and for the purposes stated.

JAMES H. CLOYES.

Witnesses:
RALPH ORWIG,
THOMAS G. ORWIG.